United States Patent [19]

Johnson

[11] Patent Number: 4,659,134
[45] Date of Patent: Apr. 21, 1987

[54] ROLL UP TARP ASSEMBLY

[76] Inventor: Roy R. Johnson, P.O. Box 332, Barons, Alberta, Canada, T0L 0G0

[21] Appl. No.: 770,759

[22] Filed: Aug. 29, 1985

[51] Int. Cl.⁴ .......................... B60P 7/04; B65H 75/48
[52] U.S. Cl. ..................................... 296/98; 296/100; 160/245; 242/86.52; 242/107.6
[58] Field of Search ............. 296/98, 100; 160/121 R, 160/122, 245, 246, 291; 242/86.52, 86.63, 86.64, 99, 100.1, 107.1, 107.11–107.13, 107.3, 107.4 R, 107.6

[56] References Cited

U.S. PATENT DOCUMENTS

| 3,202,455 | 8/1965 | Grotz | 296/100 |
| 3,397,009 | 8/1968 | Landenberger | 296/100 |
| 3,423,126 | 1/1969 | Galvin | 296/98 |
| 4,281,872 | 8/1981 | Biancale | 296/100 |
| 4,505,512 | 3/1985 | Schmeichel et al. | 296/98 |

FOREIGN PATENT DOCUMENTS

| 1143412 | 3/1983 | Canada | 296/98 |
| 2084241 | 4/1982 | United Kingdom | 296/98 |

Primary Examiner—Robert B. Reeves
Assistant Examiner—Dennis H. Pedder
Attorney, Agent, or Firm—Carver & Co.

[57] ABSTRACT

A roll up tarp assembly for a truck having a box with an open top. The assembly includes a tarp support system which is mounted on the open top of the box and a sheet which is located on the support system so that the top of the box is covered. A hollow pipe extending longitudinally across the top of the box is provided such that the hollow pipe is located substantially centrally with respect to the sides of the box. The hollow pipe is placed on top of the sheet and affixed along its length to the sheet. A biasing device is provided within the hollow pipe such that the hollow pipe is urged to rotate towards a a predetermined side of the box and thus roll up the sheet. A locking element couplable to the hollow pipe is provided to restrain the hollow pipe from rotating when the sheet covers the open top of the box. A drawing device interconnected between the sheet and the box is also provided for drawing the sheet from a rolled up position to an extended position in which the sheet extends over the open top of the box.

6 Claims, 5 Drawing Figures

ROLL UP TARP ASSEMBLY

SUMMARY OF THE INVENTION

According to the invention there is provided a roll up tarp assembly for a truck having a box with an open top. The assembly includes a tarp support means mountable on the open top of the truck box and a sheet means locatable on the support means which covers the open top of the truck box when the sheet means is fully extended.

The assembly includes a hollow pipe which extends longitudinally across the top of the truck box and which is located substantially centrally with respect to the sides thereof. The hollow pipe is placed on top of the sheet means and is affixed along its length to the sheet means.

The assembly also includes a biasing means located within the hollow pipe. The biasing means urges the hollow pipe to rotate towards a predetermined side and rolls up the sheet means as it rotates. A locking means is provided and is couplable to the hollow pipe. The locking means acts to restrain the hollow pipe from rotating when the sheet means is fully extended covering the open top of the truck box. A drawing means interconnected between the sheet means and the truck box draws the sheet means from a rolled up position to an extended position in which the sheet means extends over the open top of the truck box.

The assembly also includes a notched flange affixed to an end of the hollow pipe, a loop of steel removeably engageable with the notched flange and lever means affixed to the loop of steel for pulling the notched flange so as to flatten the sheet means over the support means.

The drawing means may include a plurality of draw strings all attached at spaced apart intervals to a side edge of the sheet means and to an elongated pipe journalled to a side of the truck box.

By locating a crank handle affixed to the elongated pipe journalled to a side of the truck box the sheet means may be extended over the open top of the truck bow from the rolled up position by merely turning the crank handle. The crank handle may be removeably engageable with the locking means to impede the rotation of the hollow tube when the sheet means extends over the open top of the truck box. The latter feature is useful for such things as the transportation of grain.

Preferably the sheet means includes an openable segment at the periphery thereof for permitting passage through the open top of the truck box of a feed or seed auger tube. Advantageously, the biasing means may include a spring located within the hollow tube, a floating bar coupled at one end to the biasing means and at the other end to the truck box. In this way, the floating bar could restrain the biasing means so as to cause rotation of the hollow tube relative to the truck box.

The support means may include a plurality of spaced apart rods, one extending longitudinally over the open top of the truck box and the other extending transversely thereover.

The locking means may include a rubber strap affixed to the lever means and removeably engageable with the crank handle.

Preferable, the lever means may include a loop lever positioned proximate the notched flange having the loop of steel attached to another end of the loop lever and an arm member affixed to the link remote from the pivotally attached end thereof and having a coupling for attachment to the rubber strap.

The present invention includes a tarp which rolls from the center of the truck to a predetermined side. Half of the tarp rolls on the underside and simultaneously the other half of the tarp rolls on the upper side. Thus, a feed auger pipe may, whenever needed, be mounted in the track box against the wall and the auger pipe will not interfere with the rolling of the tarp.

BRIEF DESCRIPTION OF THE DRAWINGS

In drawings representing a preferred embodiment of the invention.

DETAILED DESCRIPTION WITH REFERENCE TO THE DRAWINGS

Figure 1:
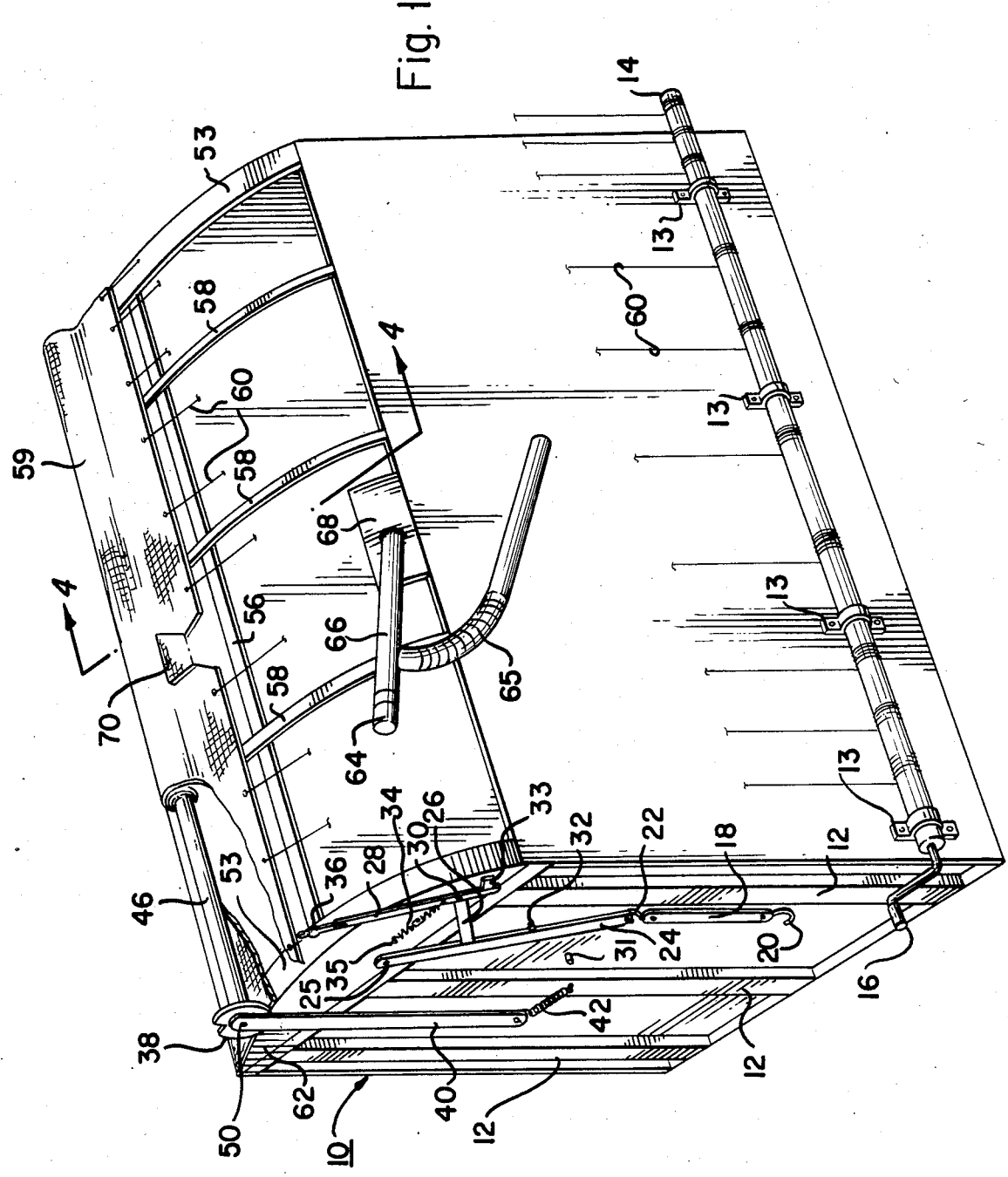
FIG. 1 is a perspective view of a truck box and the roll up tarp assembly with the tarp partially rolled up.

As illustrated in FIG. 1, the roll up tarp assembly is mounted on an open topped truck box 10 ordinarily found on farm trucks. The front of truck box 10 has vertical reinforcement tubes 12. Arcuate support arms 58 extend transversely over the open top of the truck box 10 and support member 56 extends longitudinally over the open top of the truck box 10 fastened to support rods 58 in the middle and to the underside of arcuate support strips 53 at both ends of the truck box. The spaces between these support strips 53 and the end walls of the truck box are filled in by a steel segment 62 sealed against wind and rain. A tarp 59 is positioned on top of arcuate support strips 53, arcuate support arms 58 and support member 56.

An openable segment in the form of a small flap 70 is provided proximate the periphery of the tarp to align with a seed auger pipe 66. The flap is folded back and under and secured with a hook and loop fastener such as "Velcro" and the resultant notch straddles the seed auger pipe to insure that no water can enter into the truck box. A metal anchor plate 68 permanently fastened to the auger pipe is bolted to the wall of the box securing the auger. The notch in the tarp that straddles the auger pipe, rests upon this plate. The plate therefore drains what water may enter. When the auger is removed, the flap is unfolded to original position, fastened with "Velcro" and the opening that was used to accommodate the seed auger pipe is again closed.

The tarp 59 has a plurality of drawstrings 60 affixed between one side edge 55 of tarp 59 and elongated pipe 14. The elongated pipe 14 is journalled to the side of truck box 10 by way of nylon bearings 13. A hollow pipe 46, is located on top of tarp 59 and is affixed along its length to tarp 59. A notched flange 38 is affixed to an end of the hollow tube 46 proximate the front end of the truck box 10. Floating bar 40 is coupled to axial shaft 50 which extends through notched flange 38 such that the rotation of the hollow tube 46 is not impeded. A chain 42 is coupled at one end to floating bar 40 at an end remote from the end coupled to axial shaft 50 and at an opposite end is attached to the centre reinforcement tube 12. Arm rod 24 is pivoted to the front segment 62 by means of bolt 25. Link rod 26 is attached to arm rod 24 in such a way that the former is perpendicular to the latter. A loop lever, also referred to as a first lever, 28 is attached to link rod 26 by pivotal pin 30. Link rod 26 together with arm rod 24 may be considered as a second lever. A loop of steel 36 is affixed to loop lever 28 at an end remote from pivotal pin 30.

Spring 34 is coupled at one end to loop lever 28 near pin 30 and at the other end to segment 62 by bolt 35. A rubber strap 18 is detachably engageable by hooks 20 and 22 to arm rod 24 and crank handle 16 on elongated pipe 14. Stops 31 and 32 are provided to restrict the movement of arm rod 24.

There is an orbit motor 64 at the upper end of the auger pipe 66. Hydraulic lines are not shown. Flexible tube 65 can swing as needed to fill grain drills when the box is filled with grain and the front of the box is hydraulically elevated.

Figure 2:
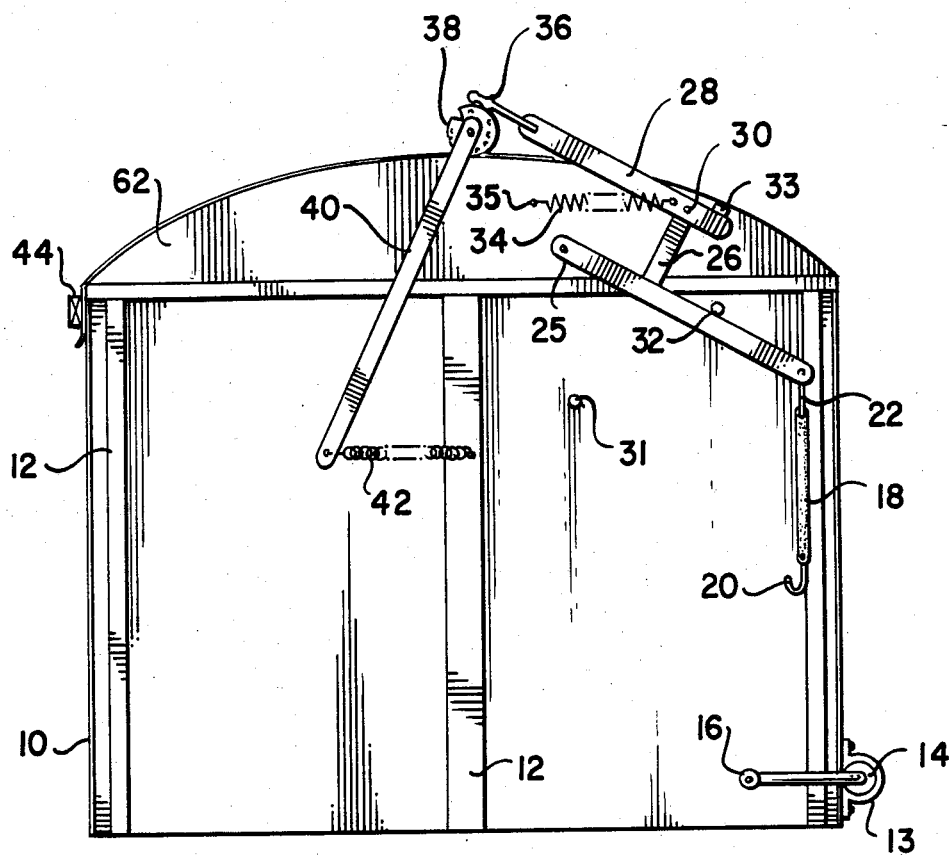
FIG. 2 is a elevation view of the front of a truck box showing a portion of the roll up tarp assembly.

In FIG. 2, elongated strip of wood 44 extends longitudinally along a side of truck box 10. Tarp 59 is bolted securely between this strap and upper edge of the truck box.

Figure 3:
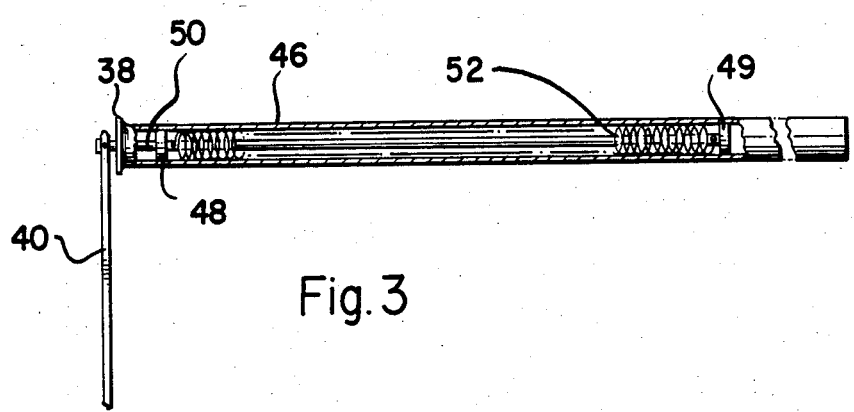
FIG. 3 is a sectional view of the hollow tube.

FIG. 3, illustrates spring 52 located within hollow tube 46. At the end proximate to notched flange 38 and bearing 48 spring 52 is affixed to pipe 46. The other end of spring 52 is affixed to axial shaft 50. The shaft is rotatably supported by bearings 48 and 49.

Figure 4:
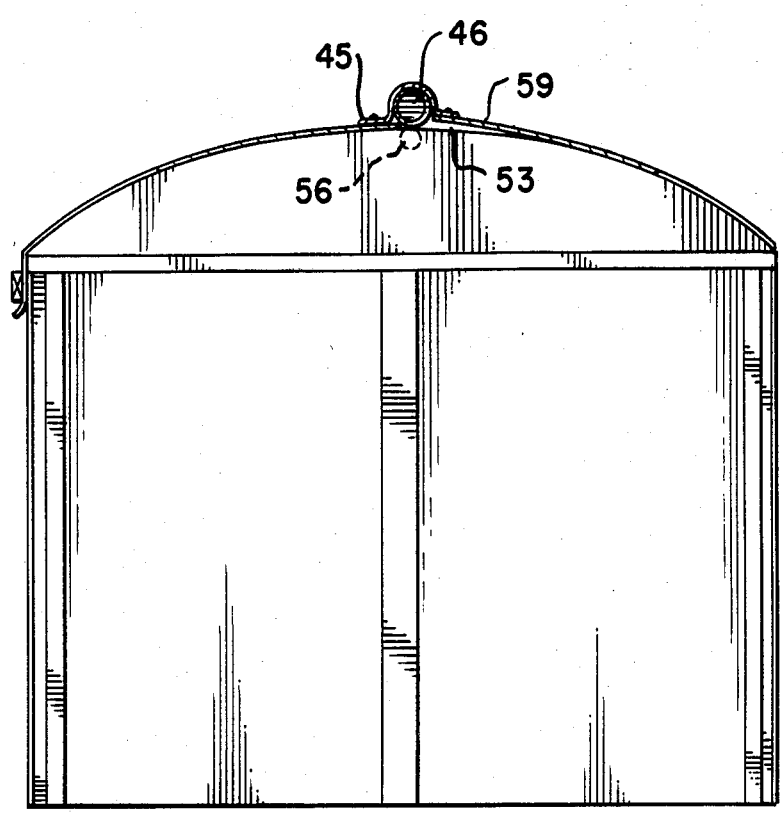
FIG. 4 is a sectional view of the truck box and the tarp taken along line 4—4 of FIG. 1 with the hollow tube centered.

FIG. 4, illustrates a cross sectional view of the truck box and the tarp. It also shows a gap between tarp 59 and strips 53 that cannot be removed by tension on tarp alone. Support member 56 which extends longitudinally of the box is shown with strip 53 fastened on top of said support member 56. Hollow pipe 46 is shown resting on tarp 59 with said hollow pipe 46 being fixed along length to the tarp 59.

Strip of tarp 45 is shown drapped over the hollow pipe 46 and the strip of tarp 45 is affixed along both sides of the hollow pipe 46 to tarp 59. This deflects rain, ice, and dirt from the crease between pipe 46 and tarp 59.

Figure 5:
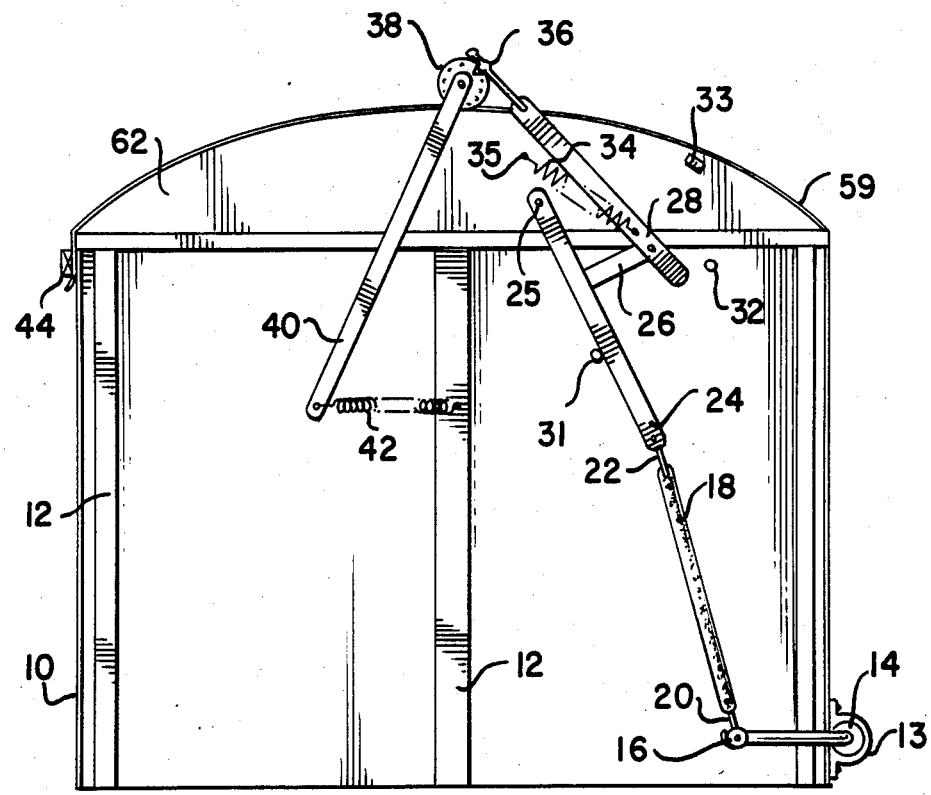
FIG. 5 is a sectional view of the tarp locked firmly in place.

FIG. 5 illustrates an end view of the tarp in its completed position. In operation, hollow pipe 46 is located substantially centrally with respect to the sides of truck box 10 when tarp 59 is fully covering the open top of truck box 10. When grain is to be transported, the loop of steel 36 is lowered so as to engage with notched flange 38. The rubber strap 18 is then engaged with crank handle 16 which causes notched flange 38 and hollow pipe 46 to rotate approximately 45 degrees as shown in FIG. 5. The 45 degree rotation has the effect of smoothing out tarp 59 over the tarp support means and of locking hollow pipe 46 into place so it will not rotate and pull up said tarp 59. To roll up tarp 59, the operator has only to disengage rubber strap 18 from crank handle 16 keeping the crank handle in its fixed position. This disengagement allows spring 34 to elevate lever 24 against upper stop 32 as shown in FIG. 2. At this point the short end of loop lever 28 has struck the adjustable block 33 causing the loop 36 on the other end to lift above the notch in flange 38. The crank 16 can then be turned allowing the pipe 46 to roll up the tarp.

To extend tarp 59 over the open top of truck box 10, the operator has only to turn crank handle 16 clockwise which causes draw strings 60 to pull tarp 59 from the rolled up position to a position fully covering the open top of truck box 10.

The loop 36 is then poised above notched flange 38. When rubber strap 18 is pulled downward, lever 28 is removed from block 33. Spring 34 as well as gravity engages loop 36 into the notch on flange 38. Engaging rubber strap 18 with crank handle 16, rotates pipe 46 slightly permitting a snug fit of tarp 59 over support strips 53. Additionally, rubber strap 18 keeps tension on crank 16 and therefore on strings 60 and tarp edge 55.

Other variations, departures, and modifications lying within the spirit of the invention and scope as defined by the appended claims will be obvious to those skilled in the art.

I claim:

1. A container assembly comprising:
   a container having sides;
   sheet means for covering and uncovering the container, said sheet means having opposite ends, a first said end being connected to one side of the container;
   support means for supporting the sheet means over the container;
   a rotatable hollow member extending over the container, said hollow member being connected to the sheet means and being at a midway position between the sides of the container when the sheet means fully covers the container;
   biasing means for rotating the hollow member so the sheet means is rolled up about the hollow member and the hollow member moves to a predetermined said side of the container to uncover the container;
   a rotatable elongated member journalled to the container;
   drawing means for drawing the sheet means from a rolled up position where the hollow member is adjacent said predetermined side to a fully covered position over the container where the hollow member is at the midway position, said drawing means comprising at least one elongated flexible member having a first end connected to a second said end of the sheet means and a second end connected to the rotatable elongated member;
   crank means connected to the elongated member for rotating the elongated member, thereby winding the drawing means on the elongated member and drawing said sheet means over the container; and
   first and second engagement means for selectively stopping rotation of the hollow member when the hollow member is at the midway position to lock the sheet means in the fully covered position, said first engagement means being a notched flange at one end of the hollow member and the second engagement means being near the midway position between the sides of the container, the second engagement means being mounted on a first lever pivotally mounted to the container and having an engagement position where the second engagement means is engagable with the notched flange to stop rotation of the hollow member, the first lever being movable towards another position to rotate the notched flange and the hollow member in a direction which tightens the sheet means.

2. A container assembly as claimed in claim 1, wherein the second engagement means is a loop.

3. A container assembly as claimed in claim 2, wherein the first lever is pivotally mounted on a second lever, said second lever being pivotally mounted on the container, the levers being arranged so the loop is above the notch when the second lever is in an initial position and moves to engage the notched flange and then rotates the notched flange and the hollow member when the second lever is pivoted from the initial position.

4. A container assembly as claimed in claim 3, wherein the first lever has a first end and a second end and is pivotally connected to the second lever between said ends, the loop being connected to the first end, a stop being connected to the container in a position to engage the second end of the first lever when the second lever is pivoted towards the initial position to disengage the loop from the notched flange.

5. A container assembly as claimed in claim 4, further comprising a resiliantly extensible member connectable between the second lever and the crank means to pivot the second lever away from the initial position to stop rotation of the hollow member and to tighten the sheet means.

6. A container assembly as claimed in claim 5, further comprising a resilient member connected between the first lever and the container and resiliently biasing the first lever in a direction so the loop engages the notched flange.

* * * * *